Fig. 1a.

INVENTOR.
JOHN K. McGEE,

United States Patent Office 3,539,895
Patented Nov. 10, 1970

3,539,895
**APPARATUS FOR CONTROLLING THE INSTANTA-
NEOUS POSITIONS AND VELOCITIES OF MOV-
ABLE ELEMENTS ACCORDING TO DIGITAL
NUMERICAL COMMANDS**
John K. McGee, Houston, Tex., assignor to Giddings &
Lewis, Inc., Fond du Lac, Wis., a corporation of Wisconsin
Filed June 3, 1966, Ser. No. 555,048
Int. Cl. G05b 19/24
U.S. Cl. 318—570          7 Claims

ABSTRACT OF THE DISCLOSURE

A numerical control for machine tools or the like which is concerned with the control of movable elements to translate them through distances, in directions, and at velocities which correspond respectively to the amount, sense, and average rate of change of dynamically and periodically changing digital command numbers. The digital signal is converted directly into an analogue signal which varies accurately in phase, relative to a reference wave, by direct digital comparison of the command number with a digitally signalled reference number which cyclically changes in synchronism with the reference wave. The reference wave is utilized to create a feedback signal which varies in phase, relative to such reference, according to the sense and extent of the displacement of the movable element, and which is compared with the phase variable commanded signal to create a polarized error signal applied to a servomotor coupled to drive the movable element.

---

The present invention relates in general to numerical control systems for machine tools and the like, and although it is susceptible of use in point-to-point positioning systems, it will find especially advantageous application in continuous path or contouring control systems. More particularly, the invention is concerned with the control of movable elements to translate them through distances, in directions, and at velocities which correspond respectively to the amount, sense, and average rate of change of dynamically and periodically changing digital command numbers.

It is the general aim of the invention to provide an improved, simple, and precise arrangement for driving a movable element so that its instantaneous position continuously agrees with a dynamically changing digitally signalled command number, such arrangement being characterized by the fact that the velocity of the movable element corresponds to average rate of change of the command number.

An important object of the invention is to convert a dynamically changing, digitally signalled command number directly into an analogue command signal which varies accurately in phase, relative to a reference wave, by direct digital comparison of the command number with a digitally signalled reference number which cyclically changes in synchronism with the reference wave, thus effectively dividing each cycle of the reference wave into a large number of small time intervals or phase periods.

It is a related object to make the apparatus for such conversion simple and precise in operation by utilizing a single counter to produce both the reference wave and the signals digitally representing the synchronized, cyclically changing reference number.

It is also an object to provide such apparatus wherein (a) the magnitude, (b) the sign (lagging or leading), and (c) the rate of change, of the phase angle between the phase-variable command signal and the reference wave respectively correspond precisely and dynamically to (a) the difference between the value of the changing command number and a certain abitrary value within the range of numbers cyclically swept by the reference number, (b) the sign of such difference, and (c) the average rate of change of the command number—so that the phase analog signal not only has magnitude but also sign and rate intelligence.

Another object of the invention is to provide a system in which the same reference wave above referred to is utilized to create a feedback signal which varies in phase, relative to such reference, according to the sense and extent of the displacement of a movable element, and which is compared with the phase variable command signal to create a polarized error signal applied to a servomotor coupled to drive the movable element, the arrangement being characterized by high accuracy when the phase error is small and by lack of spurious response when the phase error is zero.

In this latter connection, it is an object to provide a very simple and yet accurate phase comparator constituted, in effect, by a tri-state device which produces either no error signal when the phase error is zero, a positive or negative error signal when the phase error is lagging or leading, and yet wherein the magnitude of the error signal corresponds to the extent of the phase error.

Other objects and advantages will become apparent as the following description proceeds, taken in conjunction with the accompanying drawings, in which FIG. 1, which is constituted by FIGS. 1a and 1b, when joined along the indicated junction lines j—j, is a diagrammatic block and line illustration of a control system embodying features of the present invention.

While the invention has been shown and will be described in some detail with reference to a preferred and an alternate embodiment thereof, there is no intention that it thus be limited to such detail. On the contrary, it is intended to cover here all modifications, alternatives, and equivalents falling within the spirit and scope of the invention as defined by the appended claims.

THE FEEDBACK SIGNAL

Figure 1A:
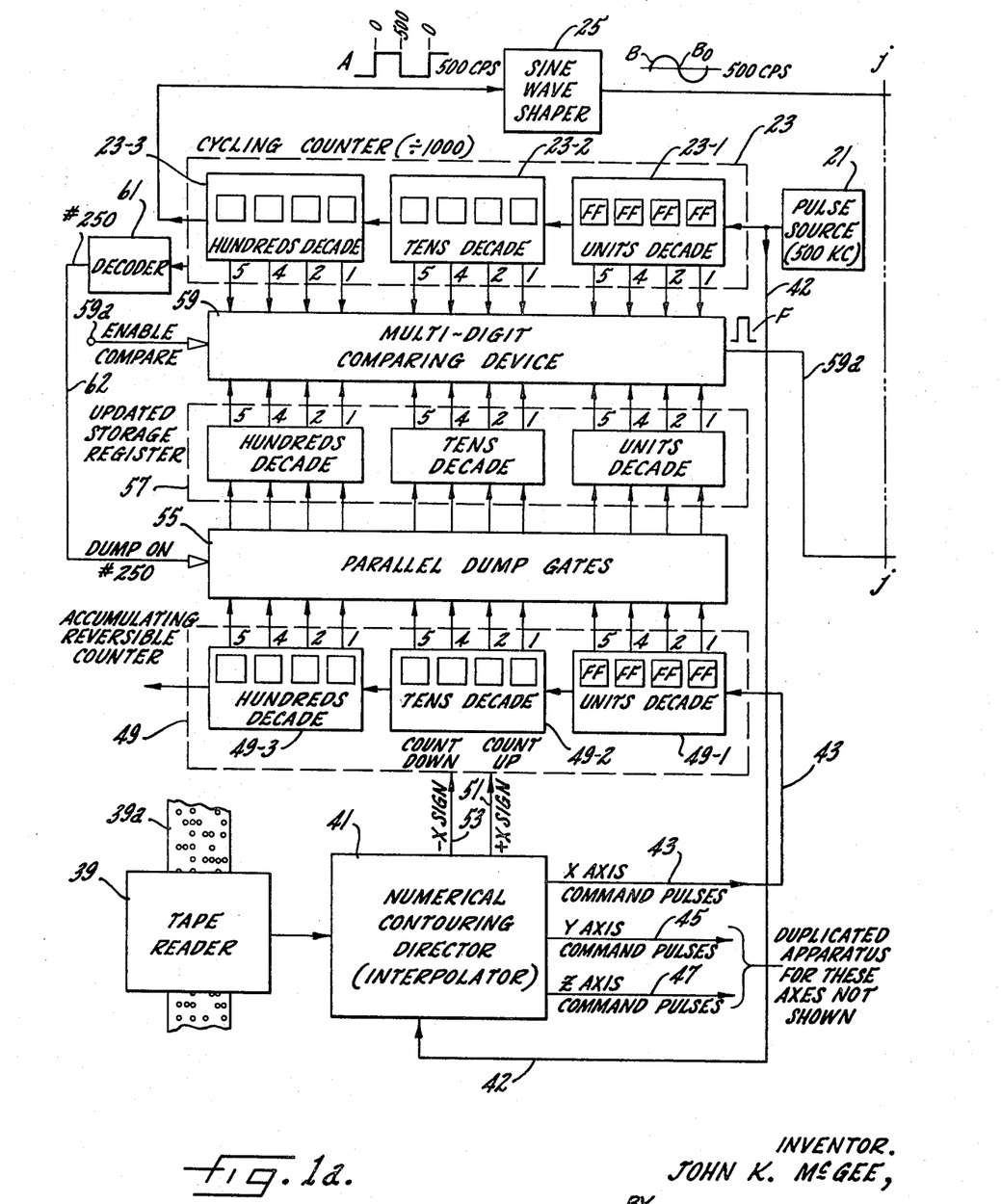
Figure 1B:
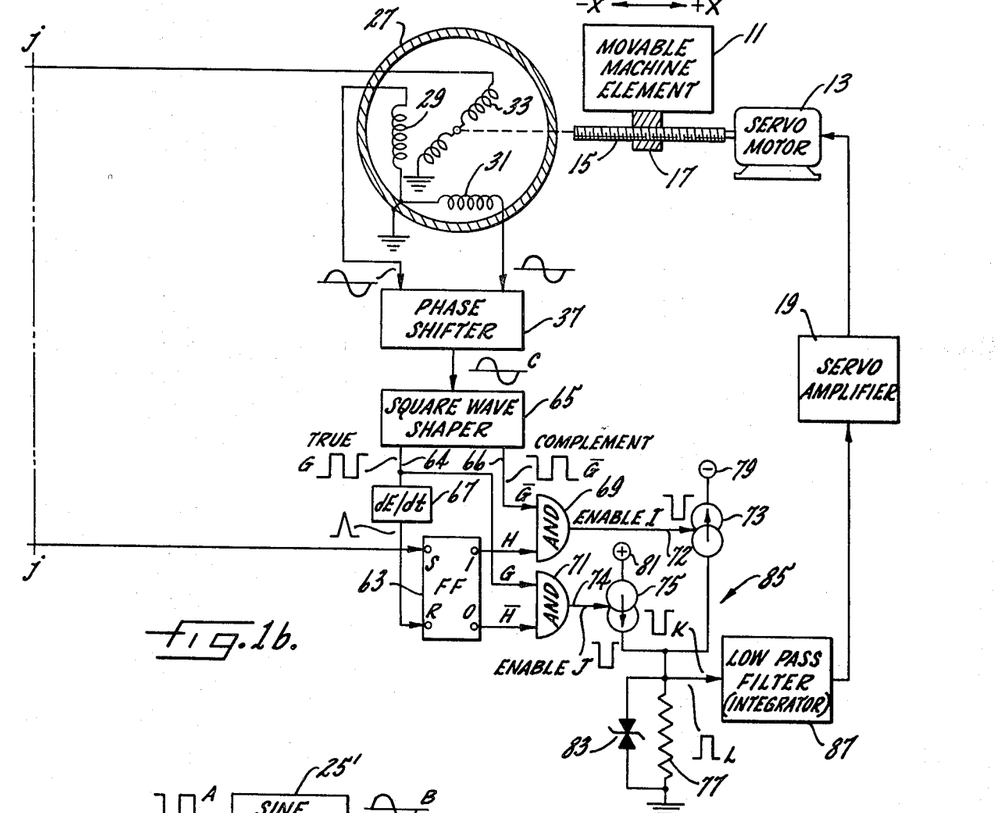

As illustrated in FIG. 1, the invention is embodied in a servomechanism for translating a movable element according to numerically defined commands. The movable element 11 is translated through distances and at velocities corresponding to the numerically defined commands by appropriate energization of a reversible servomotor 13 connected to turn a lead screw 15. Engaged with the lead screw and fixed to the element 11 is a nut 17. The element 11 is moved in a $-x$ or $+x$ direction (toward the left or toward the right in FIG. 1) and at speeds corresponding to the magnitude and polarity of a D.C. voltage applied to the servomotor 13 by a servoamplifier 19. The manner in which the signal for driving the servoamplifier 19 is derived forms an important part of the invention and will be described hereinafter.

In carrying out the invention, a comparison is made between the instantaneous position of the movable element 11 and a signal representing the directed, instantaneous, and dynamically changing position of the element. Based on this comparison an error signal is produced whose sense and magnitude correspond to the sign and extent of the error which exists between the instantaneous directed and actual positions of the element.

In this manner, the velocity of the element is made to correspond to the rate of change in the commanded or directed instantaneous position.

Provision is made to generate a feedback signal whose phase relative to a reference signal, or relative to the recurring count of a cycling counter, is indicative of the actual instantaneous position of the movable machine element 11. Although this may be accomplished by any of a variety of specific forms of apparatus, the exemplary arrangement here shown includes a pulse source 21 whose output pulses recurring at a constant predetermined frequency are divided by some factor by a cycling counter 23 to produce a reference wave at a second, lower frequency. The significance of the counter 23 will be pointed out more fully hereinafter. In the exemplary system of FIG. 1, the frequency of the pulse source is assumed to be 500 kilohertz and the scale or count capacity of the cycling counter 23 is 1000 so that a recurring reference square wave A of 500 cycles per second appears at its final "carry" output.

By means of a sine wave shaper 25 the 500 c.p.s. square wave A is converted into a recurring 500 c.p.s. sinusoidal reference signal B which is preferably in phase with the square wave signal A. However, it will not detract from the operation of the system if the conversion introduces a constant phase angle between the two recurring waves A and B.

To provide an indication of the actual instantaneous position of the movable element 11, means are provided for producing a recurring feedback signal which is indicative by the sense and magnitude of its phase angle, relative to the reference signal B, of the sign and extent of the displacement of the movable element from a datum position. Synchronous induction devices having two relatively movable parts are particularly suitable for this purpose. Many such induction devices are known and may take the form of rotary synchronous resolvers or linear "Inductosyn" scales. In either case the synchronous induction device includes one or more input windings excited with one or more sinusoidal voltages and has inductively coupled output windings or conductors which produce output voltages varying in phase or amplitude as a function of the relative positions of two movable parts. For purpose of illustration, the synchronous induction device is here shown as a resolver 27 having a stator with a pair of stator windings 29 and 31, and a rotor carrying a rotor winding 33. The resolver rotor is mechanically coupled through suitable gearing (not shown) to the lead screw 15 so that as the latter is turned by the servomotor 13, the resolver rotor turns with it. As a specific example, the resolver rotor may be geared to the lead screw 15 so that it makes one revolution for each 0.1 inch of travel by the movable element 11.

The resolver 27 is excited by the sinusoidal reference signal B fed to its rotor winding 33. The resulting pulsating magnetic field induces a pair of sinusoidal signals in the stator windings 29 and 31 with the amplitude of the output signals varying as sine and cosine functions of the angular position of the stator windings with respect to the rotor winding 33.

By means of a phase shifter 37 the variable amplitude sinusoidal signals appearing across the resolver stator windings 29 and 31 are converted into a single sinusoidal signal C which is of constant amplitude but whose phase relative to that of the sinusoidal reference signal B shifts 360° with each complete rotation of the resolver rotor. Such phase shifters are well known in the art, a suitable example being disclosed in Fitzner U.S. Pat. 3,215,915. In the illustrated example, for each 0.1 inch movement of the machine element 11, the resolver rotor winding 33 is rotated 360° so that with each such movement of the element the feedback signal C is shifted by 360° relative to the reference signal B. As the machine element 11 continues to move, the feedback signal C is brought into phase with the reference signal B at successive "datum" positions spaced 0.1 inch apart. When the element 11 is moved to the left or to the right of such a datum position, the sense and magnitude of the phase angle $\phi 2$ between the mid-cycle points of the feedback signal C and the reference signal B reflects the sign and extent of the displacement of the element from that datum position. The particular locations of the datum points along the path of travel at which the feedback wave C is in phase with the reference wave B may be adjusted by physically turning the stator of the resolver 27 and then re-locking it in place.

Figure 2A:
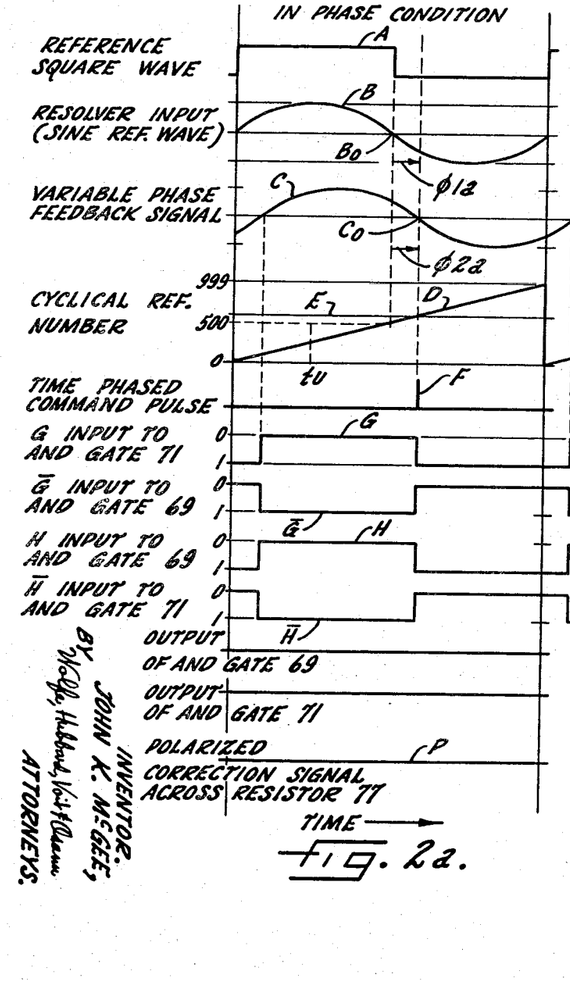
FIGS. 2a, b and c illustrate the time relationships of signals in the system under three different conditions.
Figure 2B:
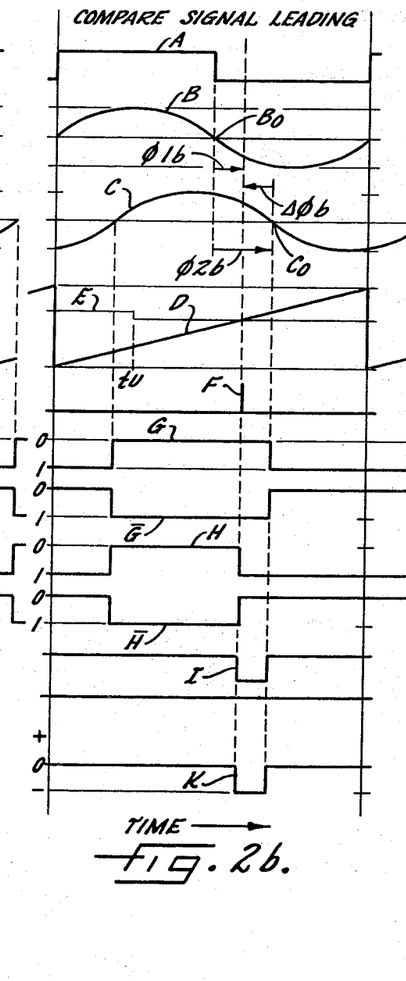

The phase relationships just described are illustrated in FIGS. 2a–c. In FIG. 2a the feedback signal C lags the reference wave B by a small angle $\phi 2a$ indicating that the movable element 11 is on one side, say to the right, of one of the datum points. In FIG. 2b the feedback signal C lags the reference wave B by a larger angle $\phi 2b$, indicating additional movement of the movable element 11 away from the datum position at which it was at the instant for which the wave forms are shown in FIG. 2a.

Figure 2C:
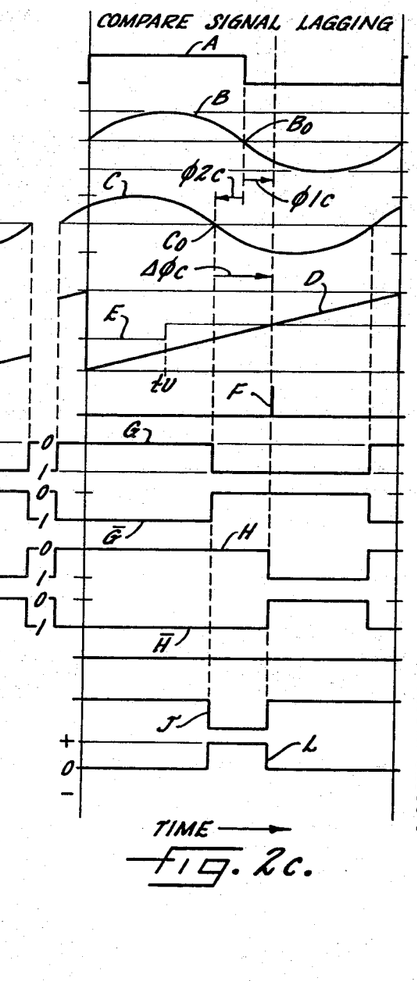

FIG. 2c illustrates the relative phases of the feedback signal C and the reference wave B when the movable element 11 is on the opposite side of a datum position from that illustrated in FIGS. 2a and 2b. In such a case the feedback signal C leads the reference wave B by an angle $\phi 2c$.

THE DYNAMICALLY CHANGING COMMAND NUMBER

The present invention makes it possible to control the movable element 11 such that the extent, direction, and velocity of its movement respectively agree with the amount of change, sense of change, and rate of change of a dynamically changing, digitally represented command number which, by its instantaneous value indicates the desired instantaneous position of the element. Although such a changing command number may be produced and represented by digital electrical signals by a variety of apparatus and methods, FIG. 1 illustrates in diagrammatic form a typical arrangement in order that one exemplary environment for the invention will be made clear.

In numerical control systems for machine tools, it is common practice to control the motions of a plurality of elements movable along a plurality of axes so as to produce resultant increments of motion between a workpiece and cutting tool of desired lengths and at different angles in space. As illustrated in FIG. 1, a tape reader 39 is arranged to read numerical programmed information one block at a time from a punched tape 39a and to supply its output signals to a numerical contouring director 41 which also receives input pulses from the source 21 via a line 42. Multi-axis numerical contouring directors such as that represented at 41 are well known in the art and need not be described here in detail. It will suffice simply to note that the director functions to produce trains of command pulses on lines 43, 45, 47 for X, Y and Z axes of movement. Such command pulses for a given axis each represent a given increment of commanded motion (e.g., .0001"), and thus by their total number and their frequency represent a desired extent of movement and a desired velocity of movement along that axis. By coordinating the number and frequency of command pulses for the X, Y and Z axes, the axis component distances and velocities will result in combined motion of a desired extent and at a desired angle in space.

The element 11 shown in FIG. 1 is assumed to be movable along the X axis, and the manner in which it is controlled in response to command pulses produced by the director 41 on line 43 will be explained in detail below. Because the apparatus for controlling elements movable along the Y and X axes may be substantially like that here illustrated for the X axis, only the latter is shown in detail.

It should be observed that the director 41 receives sign information from the tape reader 39 and it indicates by signals on lines 51 or 53 whether the motion directed by command pulses on line 43 is to be in a positive or negative direction (+$x$ to the right and −$x$ to the left as illustrated adjacent the movable element 11). Moreover, it may be assumed that each of the command pulses on line 43 is non-coincident in time with any of the pulses produced by the source 21.

The command pulses on line 43 are serially spaced in time. To convert them into a digitally signaled command number which changes at a rate proportional to the command pulse frequency, such pulses are applied to the input of an accumulating reversible counter 49. In the illustrative embodiment, the reversible counter 49 has three cascaded decades, the units decade 49–1, the tens decade 49–2, and the hundreds decade 49–3 for storing the units, tens, and hundreds digit of a number, respectively. The counter is also provided with COUNT UP and COUNT DOWN control terminals connected to the sign-signalling lines 51 and 53.

Formed of four cascaded flip-flops interconnected by appropriate gates, each decade signals its stored digit on four output lines in binary-coded-decimal notation. Such decade counting units are well known in the art and need ot be described in detail. It is assumed that each decade signals the decimal digit "count" stored in it in the 5421 code. According to this code, signals appearing on the four output lines of each decade are respectively assigned a weight of 5, 4, 2, and 1, and decimal numbers from 1 to 9 are represented by signals appearing on one or more lines whose total weight equals the signaled number. Of course, other binary decimal codes may be used, and the 5421 code here described is merely exemplary.

With the COUNT UP input terminal 51 energized, each input pulse adds one to the number signaled at the output lines of the units decade counter 49–1. Upon every tenth input pulse, the units decade counter 49–1 feeds one pulse to the tens decade counter 49–2 and upon every hundredth input pulse, the tens decade counter 49–2 steps the hundreds decade counter 49–3 by one. Each of the three decade counters resets itself upon the tenth pulse it receives so that the total capacity of the three-decade counter 49 is 999 with the total number of accumulated pulses being represented by a unique combination of signals on the twelve counter output lines.

To reverse the operation of the reversible counter 49, its COUNT DOWN control terminal 53 is energized, causing the counter to diminish the number signaled at its output terminals by one for each pulse fed to its input.

The number signaled at the outputs of the accumulating reversible counter 49 represents the commanded instantaneous position of the movable element 11 along the X axis and the rate at which the signaled number changes represents the directed velocity of the element. To translate the element 11 in a +$x$ direction at a given velocity, the number signaled by the reversible counter 49 is increased by an amount and at a rate which corresponds to the desired distance and velocity of the element. Similarly, if it is desired to translate the element in a −$x$ direction, the number signaled by the counter is diminished by a corresponding amount and at a corresponding rate. Accordingly, when the numerical contouring director 41 is informed by the tape reader 39 that the element 11 is to be translated in the +$x$ direction at a given velocity, the director feeds a +$x$ signal via line 51 to the COUNT UP terminal of the accumulating reversible counter 49 and feeds a series of X axis command pulses to the counter through the line 43, the number of pulses representing the distance to be moved in the +$x$ direction and the pulse repetition rate representing velocity.

Assuming, for the sake of example, that each X axis command pulse represents a directed movement of 0.0001 inch, a +$x$ movement of 1.0 at a rate of 2 inch per second would be signaled by 10,000 X axis command pulses fed to the accumulating reversible counter 49 at a rate of 20 kilohertz. The counter 49 would thus theoretically increase its stored and signaled count by 10,000, but since it signals only the three lowest order digits, the command number digitally signaled in 5421 code on its twelve output lines will increase from 000 to 999, and then repeat such counting nine more times, finally ending on 000. Thus, while the total capacity of the accumulating reversible counter 49 is only 999, the total number of X axis command pulses received may well be in excess of this amount. In effect, if the total number of X axis command pulses represent a command number, the accumulating reversible counter signals only the three least significant digits of the command number. For reasons which will become apparent as this description proceeds, this portion of the total command number is sufficient for proper operation of the system.

When the command pulses on line 43 represent motion in a negative direction, and the line 53 supplies an enabling signal to the COUNT DOWN terminal, the counter 49 simply counts in a reverse sense, so that the command number signaled on its twelve output lines decreases by one in response to each command pulse. It will thus be seen that the counter 49 signals in digital, binary decimal code a command number which changes in a sense and at a rate corresponding to a directed direction and velocity of motion for the element 11.

In the apparatus as thus far described, the command number digitally signaled by the reversible counter 49 changes in uniform increments of one and at different rates which depend upon the frequency of the received command pulses. For a reason which will become apparent hereinafter, it is desirable to signal the changing command number with a different type of variation, and specifically such that it is periodically updated no oftener than once during each cycle of the reference wave B (i.e., once during each cycle of the reference counter 23). For this purpose, the signals on the twelve output lines of the accumulating counter 49 are periodically dumped in parallel through dump gates 55 into the corresponding bit storage devices of a three-decade updated storage register 57. Although such dumping action may be triggered by clocked timing signals, the exemplary arrangement of FIG. 1 includes a decoder 61 coupled to the reference counter 23 and arranged to produce an output signal on a line 62 each time that counter contains a predetermined count, here assumed to be 250. That output signal is applied to an "enable" terminal of the dump gates 55 and causes the latter to momentarily "open," so that the contents of the counter 49 will be transferred in parallel to the storage register 57. Thus, if the counter 49 signals the decimal number 467 at the instant the dump gates open, the storage register will be set to hold the number 467 and to digitally represent such number in 5421 binary decimal code by signals on its twelve output lines.

The command number digitally signaled on the storage register output lines is thus one which dynamically changes. However, it changes at time instants spaced no closer than the period of the reference wave B; or in other words it changes 500 times a second, and in particular at each instant that the reference counter passes through a count of 250. The amount of the change in the command number at each "updating" depends upon how much the count in the counter 49 has changed since the previous updating. Thus, the command number digitally signaled by the output of the storage register 57 is in the present instance changed or updated at uniformly spaced time instants, but the sense of the change and the average rate of the change correspond to the sign of the commanded movement and commanded velocity of movement. The updating occurs so frequently (e.g., 500 times per second) that the amount of each change in the represented command number cannot be excessive even when the director command pulses call for the maximum programmable velocity of the element 11.

The updated, dynamically changing command number may be derived from any suitable source, and the present illustration of a director 41 producing command pulses which are received in the accumulating counter 49 is intended only to represent one example.

THE CYCLICALLY CHANGING REFERENCE NUMBER

In further keeping with the invention, provision is made to produce signals digitally representing a reference number which during successive time intervals repeatedly and cyclically changes in small uniform increments from a first to a second predetermined value. The signaled reference number itself thus undergoes successive cycles of variation, relative to which a repeating signal may vary in phase. In the preferred form of the invention, the reference number uniformly changes by small increments from one value to another during each cycle of the reference wave B. The reference number thus cyclically changes from a first value to a second value by uniform increments spaced by uniform short time periods during each cycle of the reference wave, and in synchronism (equal cycle intervals and constant phase) with that wave.

More particularly, means are provided to produce binary coded decimal signals which change to signal a reference number that increases or decreases linearly in uniform steps at uniform time intervals during each cycle of the reference wave B. The reference number thus cyclically increases from a minimum value (e.g., 000) to a maximum value (e.g., 999) and then repeats, in synchronism with the reference wave B. In effect, therefore, each increment of the reference number corresponds to one time portion of a cycle of the reference wave, the latter being divided up into many small time intervals equal in number to the number of counts or increments in the reference number variation.

In the preferred and advantageous form of the invention here shown, the cyclically varied reference number, synchronized with the reference wave B, is digitally signaled by the same reference counter 23 which divides the pulses from the source 21 to produce the reference wave. Thus, because the three-decade reference counter 23 receives 500 kilohertz pulses from the source 21, it will repeatedly and cyclically count from a decimal number content of 000 to 999 five hundred times a second. The counter 23 is constituted by a units, a tens, and a hundreds decade 23–1, 23–2, and 23–3 connected in tandem, each decade containing four flip-flops interconnected by gating (not shown) so that it repeatedly counts from 0 to 9 and signals its contents on four output lines in 5421 binary code. Thus, the cycling counter 23 functions in the same manner as the accumulating counter 49 when the latter is operating in the "COUNT UP" mode.

With each series of 1000 pulses from the pulse source 21, the cycling counter 23 is successively stepped through 1000 different states from 000 to 999 during each of which the counter signals on its twelve output lines in the 5421 binary decimal code the number of pulses which it has received. The thousandth pulse resets counter 23 to 000 so as to begin the signaling at its output of a new series of 999 increasing numbers.

The counter 23 is stepped through its complete cycle once during each cycle of the reference signal B. The "phasing" of the cycling count and the reference signal B is immaterial so long as it is constant. That is, the count of the 1000 count capacity counter 23 might be, for example, 150 at the instant the reference wave B begins a cycle, 650 at an instant midway through that cycle (when the negative-going zero crossing B occurs), and again 150 at the start of the next reference wave cycle. In the illustrated system, it is assumed for convenience of explanation that the reference square wave A is derived from the "carry" output of the last flip-flop of the hundreds decade 23–3 in the cycling counter 23, and that the square and sinusoidal waves A and B are in phase with one another, so that the "count" of the counter is 000 when each cycle of the reference wave B begins, such count increases to 500 when the first half cycle of the wave B is complete (at the instant of the zero crossing $B_0$), and the count is returned to 000 at the start of the next cycle of the wave B. Thus, synchronism of the frequencies and a fixed time relationship between the cycles of the signaled reference number and the reference wave B is achieved by deriving the reference number signals and the reference wave B from the same counter 23.

As shown in the case of the units decade 23–1, each of the three decades of the cycling counter is made up of four flip-flops and, to generate a binary coded decimal 5421 code, the flip-flops are so interconnected by gates (in a manner known per se and therefore not shown) that the last flip-flop of each decade reverses its state after the fifth and tenth pulse received by the decade. Consequently, the last flip-flop of the hundreds decade 23–3 reverses its state after the five hundredth and one thousandth pulse fed to the counter 23 and after each five hundred subsequent pulses are fed to the counter. This makes the midpoint of each cycle of the reference wave B (here shown as a negative-going zero crossing $B_0$) coincide in time with the middle value (here 500) of the range through which the reference number cycles. It should be understood, however, that the count signaled by the counter may have any particular desired value (hereinafter called the reference mid-point value) at the instant the reference wave B reaches the mid-point $B_0$ of each of its cycles.

The phase relation here assumed between the reference square wave A, the reference wave B, and the number signaled by the cycling counter 23 is indicated in FIG. 2a by the positively sloped line D. The vertical scale to the left of the line D indicates that, during a complete cycle of the reference square wave A, the reference number D signaled by the cycling counter 23 increases from 000 to 999 at a uniform rate, and that the mid-point of the square wave A occurs at the instant when the cycling counter is just turning 500, the middle of its total range. The same relationships apply to the reference wave B, since it is assumed to be in phase with wave A. However, if the reference wave B happened to lag the wave A by a constant phase angle of 90°, then the reference mid-point value of the signaled changing number would be 750.

It will be apparent that instead of employing a counter which repeatedly counts up to produce signals representing a cyclically increasing reference number, a similar counter may be used to repeatedly count down and signal a cyclically decreasing reference number.

TIME PHASED COMMAND SIGNAL PRODUCED BY DIGITAL COMPARISON

In accordance with the invention, provision is made to produce a repeating signal at each instant when the cyclically changing and digitally signaled reference number is equal to the periodically changing, digitally signaled command number. In this way, the phase angle or phase modulation of the repeating signal varies in sign and magnitude (relative to the cycling intervals of the reference number signaled by the counter 23) according to the sense and extent of the changes in the command number. More specifically, the repeating signal is produced by comparing the cyclically changing reference number and the dynamically changing command number, so that the phase angle of that repeating signal changes in sense and extent (relative to the recurring reference wave B, which is fixed in phase relative to the cycling intervals of the reference number) according to the sense and extent of the difference between (a) the mid-point value (e.g., 500 as here described) of the cyclically changing reference signal and (b) the instantaneous value of the updated command number. Thus, the digital intelligence of the dynamically changing command number is converted into a corresponding phase analog variation, since the phase angle between the repeating signal and the reference wave changes by amounts, in sense, and at an average rate which corresponds respectively to the amount, sense and average rate of change of the command number.

As here shown in FIG. 1, this comparison of two digitally represented but changing numbers is effected by connecting the twelve output lines of the cycling counter 23 and the twelve output lines of the updated storage register to the respective inputs of a fast-acting multi-digit comparing device 59. Binary coded decimal number comparators are per se well known to those skilled in the art, and thus it is not necessary to show or describe the details of the device 59. It will be helpful to note, however, that the comparing device operates to produce a compare signal F in the form of a short pulse on its output line 59a only when the reference number digitally represented in 5421 binary code on the output lines of the counter 23 is equal to the updated command number digitally represented in 5421 binary code on the output lines of the storage register 57. To prevent spurious compare signals due to "ripple" in the counter 23, the compare device may be normally disabled and enabled by application of a pulse to a control terminal 59b after a short delay from the instant of each pulse from the source 21. Such clocking or timing means to enable the compare device are well known per se and will not be described in detail.

It will be apparent that at some value of the reference number during each cycle thereof (from 000 to 999) it will become equal to the digitally signaled command number because the latter, being a three-digit decimal number, will always fall with the range spanned by the cyclically changing reference number. Thus, a compare signal, constituting a variable phase command signal, will be produced at some instant during each cycle of the reference counter 23. It would be possible, in the practice of the invention, to cause the digitally signaled reference number to cycle between minimum and maximum values other than 000 and 999 here given by way of example. In that event, however, the dynamically changing command number would be restricted so that it too always had a value falling within such other maximum and minimum values.

The manner in which the compare signal F, i.e., the phase variable command signal, changes in phase relative to the reference signal B is illustrated in FIGS. 2a, b, c. In these figures, the number held in the storage register 57 is represented by the horizontal lines E, and the instant of equal comparison is indicated by their intersections with the lines D representing the cyclically changing reference number.

Since the reference number D increases from its minimum to its maximum value once during each cycle of the reference signal B, the instant, or phase, during the cycle of the reference signal B when the compare signal F occurs is unambiguously determined by the amount to which the reference number D has increased when it becomes equal the command number E. Hence, the phase of the compare pulse F with reference to the phase of the reference wave B is determined by the magnitude of the command number E, so that the compare signal F is itself a time phase command signal. Specifically, assuming that the reference signal B is positive during the first half of its cycle, the compare signal F is time-phased relative to the negative-going zero crossing of the reference signal B (shown in FIG. 2a as $B_0$) by an angle $\phi 1$ which in sign and magnitude corresponds to the sign and magnitude of the difference between the command number E and the mid-point value (here 500) of the reference number D. Thus, with a total range of 000 to 999 for reference number D, the compare signal F will be exactly in phase with the negative-going zero crossing $B_0$ of the reference signal B, and the angle $\phi 1$ will be zero when the command number E is 500. For command numbers less than 500, the compare signal F will lead the negative-going zero crossing point $B_0$ and similarly for command numbers exceeding 500, the compare pulse F will lag $B_0$. If the command number is 400, then the compare signal will lead the crossing point $$B_0 \text{ by } (400-500) \times \frac{360°}{1000} = -36°$$

whereas if the command number is 510, the compare signal will lag the crossing point $$B_0 \text{ by } (510-500) \times \frac{360°}{1000} = +3.6°$$

This phase angle $\phi 1$ represents the commanded instantaneous position of the movable element 11 from the nearest datum point for the resolver 27. It is within the broader aspects of the present invention to utilize the phase variation of the compare signals F relative to the reference wave B directly in an open loop control system, without feedback means. The phase of the compare signals F may be converted directly into a variable D.C. voltage for application to a condition-controlling actuator. However, in another aspect of the invention, the compare signal is utilized in a closed loop phase-error control system as hereinafter described.

UPDATING THE COMMAND NUMBER

To keep the position and velocity of the movable element 11 in conformance with that directed by the contouring director 41, the information in the storage register 57 is periodically updated, as previously explained, so that the comparison between the command number E and the reference number D may be made on the basis of "fresh" information. Although it is desirable to update the storage register 57 frequently, this must not occur more than once during each cycle of the reference signal, otherwise two mutually conflicting compare signals F might be generated during the same cycle of the reference wave B. Accordingly, no more than once during each cycle of the reference signal B a dump signal is applied via line 62 to the parallel dump gates 55 so as to bring the information in the storage register 57 up to date with the number stored in the accumulating reversible counter 49. The dump signal may be produced by any suitable clock or timing arrangement. As here shown, the dump signal is conveniently derived from the cycling counter 23 by means of the decoder 61, typically a set of coincidence gates having inputs connected to the output lines of the cycling counter 23 and arranged to produce a dump signal when the number D reaches a particular value at which updating of the storage register 57 is to occur.

In the system of FIG. 1, updating of the storage register 57 is indicated to occur when the reference number D is 250. With coincidence gates serving as the decoder 61, the storage register 57 is updated during each cycle of the reference signal B. This need not necessarily be so and less frequent updating may be attained by placing a pulse frequency divider between the decoder 61 and the dump gates 55 so as to bring the storage register 57 up to date during every second or every third cycle of the reference wave or even less frequently.

FIGS. 2b and 2c show two examples of updating, both at the same instant $t_u$ during the cycle of the reference signal B. In the example, of FIG. 2b, the command number E is reduced by updating, while in the example of FIG. 2c the change is in the opposite direction. It is important to note that the instant of occurrence of the compare signal F is determined by the magnitude of the updated command number E.

THE PHASE ERROR SIGNAL

In accordance with the invention, the time phased command signal F and the variable phase feedback signal C are caused to operate a single bistate device whose output are then used to produce a polarized error signal which is indicative of the magnitude and the sense of the error phase angle between the phase command and feedback signals. The bistate device, shown as a flip-flop 63, has two stable states which will be referred to as its "0" and "1" states. The flip-flop 63 is set into its "1" state at the instants when the reference number D becomes equal to the command number E by the compare signal F, fed to its "set" input terminal S from the output of the comparing device 59.

Means are also provided for resetting the flip-flop 63 into its "0" state at the instant of each positive-going zero crossing of the feedback signal C. The positive-going zero crossing signal for resetting the flip-flop is derived from the feedback signal C by means of a square wave shaping circuit 65. At one of its output terminals 64 the square wave shaper 65 produces a first square wave G which is in phase with the feedback signal C. The square wave G is fed to a unipolar differentiating circuit 67 whose output is connected to the reset input terminal R of the flip-flop 63. In response to each positive-going wave front of the square wave G, and hence at the positive-going zero crossings of the feedback signal C, the differentiating circuit 67 produces a triggering pulse which reset the flip-flop. It will be understood, of course, that the application of a pulse to the set or reset terminals S or R when the flip-flop 63 is already in its set or reset state simply leaves it in its existing state.

The flip-flop 63 has a pair of output terminals labeled "1" and "0". When the flip-flop is in its "1" state, the "0" output produces a logic signal which is at the logical "0" level and the "1" output produces a logic signal at the logical level. In the embodiment of the invention illustrated in FIG. 1, the logical "0" level is positive relative to the logical "1" signal level. When the flip-flop is reset into its "0" state, the logic signals at its outputs are reversed with a logical "1" signal appearing at the "0" output and a logical "0" signal appearing at the "1" output.

At a second output terminal 66, the square wave shaper 65 produces a complement of the square wave G, such complement being labeled $\overline{G}$. Thus, at all times, the square wave shaper produces at its two outputs a pair of bi-valued logic signals, one signal, $\overline{G}$, being at a relatively low, binary logic "1" level during each positive half cycle of the feedback signal C and at a binary "0" level during each negative half cycle of the feedback signal. The other square wave signal, G, is at a low, binary logic "1" level during each negative half cycle and at a binary "0" level during each positive half cycle of the feedback signal (FIG. 2a).

In order to produce a polarized D.C. signal which is indicative of the sign and magnitude of the error phase angle between the feedback signal C and the compare signal F, the complement output $\overline{G}$ of the square wave shaper 65 and the "1" output H of the flip-flop 63 are applied to a first AND gate 69, and the G output of the square wave shaper 65 and the "0" output $\overline{H}$ of the flip-flop 63 are applied to a second AND gate 71.

The outputs of the AND gates 69 and 71 are connected to control terminals 72 and 74 of two current generators 73 and 75 respectively. The generators work into a common load resistor 77, but are oppositely poled so that when the negative current generator 73 is turned on, current flows from ground through the resistor 77 and through the generator 73 into a negative terminal 79 thus establishing a negative voltage across the resistor. Conversely, when the positive current generator 75 is turned on, current flows from a positive terminal 81 through the generator 75 and the resistor 77 into ground, causing a positive voltage to appear across the resistor. Regardless of which current generator is turned on, the size of the signal across the resistor 77 is kept at a predetermined magnitude by a bipolar Zener diode 83 connected across the resistor.

Thus the two current generators 73 and 75, the resistor 77, and the bipolar Zener diode 83 operate as a single tri-state signal generating unit. When the generating unit, generally indicated as 85, is in its first state, both generators 73 and 75 are off and no voltage appears across the resistor 77. The tri-state unit 85 is placed in its second or "positive on" state by turning on the positive current generator 75, establishing a positive signal across the resistor 77. To place the unit 85 in its third, "negative on" state the negative current generator 73 is turned on instead, thus establishing a negative signal across the resistor 77.

As will become clear, the flip-flop 63 together with the AND gate 69 connected as shown to receive the H and $\overline{G}$ signals constitute means for setting the tri-state generator 85 to its third state (negative on) in response to a compare signal F occurring prior to a negative-going zero crossing in each cycle of the feedback signal, and means for resetting the tri-state generator 85 to its first state (zero output) when such zero crossing occurs. This operation occurs when the command phase (command signal F) leads the feedback wave C from the resolver 27. On the other hand, the flip-flop 63 together with the AND gate 71 connected as shown to receive the G and $\overline{H}$ signals constitutes means for setting the tri-state generator 85 to its second state (positive on) in response to a negative-going zero crossing of the feedback wave C occurring prior to the compare signal F during each cycle of that wave, and for resetting the generator 85 to its first state (zero output) when such compare signal occurs. Such action takes place when the command phase (command signal F) lags the actual position phase of the feedback wave C. In either case, the period during which the tri-state generator is in its second or third states (positive on or negative on) is proportional to the error phase angle between the command phase pulses F and the feedback wave C.

Viewed in a different way, the tri-state generator together with the gates 69 and 71 which control it constitute means for producing a first type of error signal (negative voltage across resistor 77) during periods when the flip-flop 63 is in its "1" state and the feedback signal C is concurrently in a positive half cycle; and they also constitute means for producing a second type of error signal (positive voltage across resistor 77) during periods when the flip-flop 63 is in its "0" state and the feedback signal is concurrently in a negative half cycle.

When the compare signal F leads the negative-going zero crossing point $C_0$ of the feedback signal C, the first AND gate 69, controlled by the $\overline{G}$ and H signal outputs of the wave shaper 65 and the flip-flop 63 sets the tri-state signal generating unit 85 to its "negative on" state so as to produce a negative signal across the resistor 77 for a time interval which is directly proportional to the amount of the phase lead.

Similarly, when the compare signal F lags the point $C_0$, the second AND gate 71, under the control of the signals G and $\overline{H}$ sets the signal generating unit 85 to its "positive on" state, again for a time interval directly proportional to the amount of the phase lag.

The manner in which the square wave shaper 65, the flip-flop 63, the AND gates 69 and 71 and the tri-state signal generating unit 85 cooperate to produce the bipolar signals just described is best explained with reference to the diagram of the various signals in FIGS. 2a–2c.

Refer first to FIG. 2a which illustrates the command phase signal F occurring in phase with the feedback wave C, i.e., coincidentally with the negative-going zero crossing $C_0$. As the feedback signal C passes through zero in a positive direction, the signal G becomes positive and goes to the binary "0" level. At the same time the flip-flop 63 is reset and its H output signal rises to binary "0" level. Since the signal G is connected to the AND gate 71 and the signal H is connected to the AND gate 69, both gates are closed even though at their other inputs they are enabled by $\overline{G}$ (in case of the AND gate 69) and by $\overline{H}$ (in the case of AND gate 71). When the command phase pulse F appears (lagging the reference wave crossing $B_0$ by an angle $\phi 1a$) it sets the flip-flop 63, thereby making H=1 and $\overline{H}$=0. However, it is assumed that under the conditions illustrated by FIG. 2a that the feedback signal C also lags the reference wave B by an equal angle $\phi 2a$, i.e., that the commanded instantaneous position of the element 11 (FIG. 1) equals the actual position so that the command phase angle $\phi 1a$ and the actual position feedback phase angle $\phi 2a$ are equal. Under these conditions with no phase error ($\phi 1a - \phi 2a = 0$), the flip-flop 63 sets in response to a command phase pulse F, the feedback wave C simultaneously begins a negative half cycle, and the output of the square wave shaper 65 makes G=1 and $\overline{G}$=0. Thus, neither of the AND gates 69, 71 is opened, and the tri-state signal generator 85 remains in its off state. The signal across the resistor 77 remains zero, as indicated at P. So long as the phase error remains zero, this condition will continue.

Assume now that compare signal F leads the negative-going zero crossing point $C_0$ of the feedback signal C. FIG. 2b illustrates this condition with $C_0$ lagging a corresponding negative-going zero crossing point $B_0$ of the reference signal B by an angle $\phi 2b$ and with the compare signal F lagging behind the point $B_0$ by a smaller angle $\phi 1b$ so that the compare signal F leads the negative-going zero crossing point $C_0$ of the feedback signal C by $+\phi 1b - \phi 2b = -\Delta \phi b$.

With the compare signal F leading the point $C_0$ of the feedback signal C, at some instant before the signal $\overline{G}$ goes to the binary "0" level, the compare signal F sets the flip-flop 63 to its "1" state and causes its output signal H, received by AND gate 69, to drop to the binary "1" level. Since the other input $\overline{G}$ of the AND gate 69 is already at binary "1" level, the AND gate opens, and produces a signal I which turns on the negative current generator 73. This represents the third state of the tri-state generator 85 in which the generator produces a negative signal K across the resistor 77.

The AND gate 69 remains open and the generator 85 maintains the signal across the resistor 77 so long as the signals $\overline{G}$ and H remain at their binary "1" levels, that is while the feedback signal C is in a positive half cycle and the flip-flop 63 is concurrently in its "1" state. This condition terminates with the negative-going zero crossing $C_0$ of feedback signal C which causes the signal $\overline{G}$ to rise to its binary "0" level.

Thus, with the compare signal F leading the negative-going zero crossing point $C_0$ of the feedback signal C, a negative signal, shown in FIG. 2b as the signal K, is generated during a period which begins with the compare signal F and which ends with the negative-going zero crossing of the feedback signal C, that is, while the flip-flop 63 is in its "1" state and the feedback signal C is concurrently in a positive half cycle. As a result, the time interval during which the negative signal K exists during each cycle of the reference wave is directly related to the magnitude of the error phase angle $\Delta \phi b$.

Let it be assumed next that the compare signal F lags behind the same arbitrary point $C_0$ of the feedback signal C. This condition is illustrated in FIG. 2c where the negative-going zero crossing point $C_0$ of the feedback signal C is shown to lead the negative-going zero crossing point $B_0$ of the reference signal B by an angle $\phi 2c$ and where the compare signal F is shown to lag the crossing point $B_0$ by an angle $\phi 1c$. Thus the total phase difference $\Delta \phi c$ between the point $C_0$ of the feedback signal C and the compare signal F is $\phi 1c + \phi 2c$. In other words, the phase error is $\phi 1 - \phi 2 = +\phi 1c - (-\phi 2c) = +\Delta \phi c$, with the command phase lagging the actual position phase.

During the initial portion of the positive half cycle of the feedback signal C, the conditions of the AND gates 69 and 71 are the same as those illustrated in FIG. 2b. That is, the AND gate 69 is closed because the flip-flop output signal H is "0", and the AND gate 71 is closed because the square wave shaper output signal G is "0." With the negative-going zero crossing point $C_0$ of the feedback signal C leading the compare signal F by an angle $\Delta \phi c$, the feedback signal C reverse the binary levels of the square wave shaper output signals G and $\overline{G}$ some time before the occurrence of the compare signal F. In particular, at the instant when the feedback signal C crosses zero, the signal G drops to a binary "1" level. Since the flip-flop output signal $\overline{H}$, fed to the other input of the AND gate 71, is already at binary "1" level (the flip-flop 63 having been reset when the feedback signal C went through its positive zero-crossing point) the AND gate 71 is opened. Opening of the AND gate 71 in turn produces a signal J at its output which turns on the positive current generator 75 and creates a positive signal L across the resistor 77.

The AND gate remains open and the generator 75 continues to produce a positive signal across the resistor 77 so long as the signals G and $\overline{H}$ remain at their binary "1" levels, that is, while the feedback signal C is in its negative half cycle and the flip-flop is concurrently in its "0" state. This set of conditions ends with the occurrence of the compare signal F which sets the flip-flop 63 into its "1" state causing the signal $\overline{H}$ to return to its binary "0" level, thereby closing the AND gate 71. Thus a positive signal, shown in FIG. 2c as the pulse L is generated during a period which commences with the negative-going zero crossing of the feedback signal C and ends with the occurrence of the compare signal F. It will be observed that the time duration of the signal L corresponds to the magnitude of the phase error $\Delta \phi c$.

It is noteworthy that the absence of an error signal from the output of the signal generator 85 during the in-phase condition is achieved by simply turning off both the negative current generator 73 and the positive current generator 75. As a result, when the compare signal F and the negative-going zero crossing point $C_0$ coincide (FIG. 2a), the only signal that will appear across the resistor 77 will be that due to the very slight propagation delay in the flip-flop 63 which may cause it to reverse its state a few nanoseconds after the reversal of the logic levels of the square wave shaper output signals G and $\overline{G}$. This propagation delay may introduce a positive voltage spike of a few nanoseconds duration at the resistor 77 when the feedback signal C passes through its negative-going zero crossing point and similarly a negative voltage spike a few nanoseconds long may appear across the resistor 77 when the feedback signal C passes through its positive-going zero crossing. Aside from the minute propagation-induced voltage spikes which may appear, and which average out to zero, after filtering, the more serious spurious error signal which might be caused by an unbalanced current flow from both of the current generators 79 and 81 during the in-phase condition of the compare signal F and the feedback signal C is eliminated.

As the movable element 11 is being translated, the compare signal F representing the desired position and rate of change of position of the element 11 will lead or lag the negative-going zero crossing point $C_0$ of the feedback signal C through several cycles, depending upon whether the element is being driven in the $+x$ or $-x$ direction. To convert the variable width, constant amplitude pulses K or L into a smoothly variable control signal, e.g., a polarized variable D.C. voltage suitable for application to a servoamplifier and thence to the servomotor 13, they are averaged by an integrator 87 which may be simply a low pass filter. The output of the low pass filter 87 is thus a polarized D.C. signal representative of the sense and magnitude of the average error phase angle between the compare signal F and the negative-going zero crossing $C_0$ of the feedback signal C over several cycles. After amplification by the servoamplifier 19, the D.C. error signal is applied to the servomotor 13 causing it to drive the movable element 11 in a direction and at a velocity which conforms with the direction and rate of change in the phase of the compare pulse F, that is, in a sense and at a rate directed by the contouring director 41. It will be understood that as soon as the phase angle of the command phase pulse F begins to change, and the error phase angle departs from zero, the servo motor 13 begins to move, so that the phase of the feedback signal C is shifted by the resolver 27 in a direction to restore the error phase angle to zero. Thus, the instantaneous position error cannot exceed .05" and the single fine resolver 27 is sufficient to keep the system tracking the dynamically changing directed position. It is for this reason that the command number may be signalled only by the last three digit places thereof (i.e., by the three decade register 57) even though the command number in actual fact may be larger than 999.

In the foregoing description certain assumptions have been made and the system described on the basis of these assumptions for sake of simplicity. Some of these assumptions are arbitrary, and it will be understood that circuit connections or signal polarities may be reversed and the system operation modified accordingly without departing from the invention. For example, the flip-flop 63 has been described as being reset at the instant of positive-going zero crossing by the feedback signal C and set in response to the compare signal F. Yet it is apparent that the phase error signalling system would be equally effective if the flip-flop were set, instead of reset, at the positive-going zero crossing of the feedback signal C and reset, instead of set, in response to the compare signal F. To compensate for the resulting reversal in the logic levels of the flip-flop output signals, the connections of the flip-flop output terminals "1" and "0" would also be reversed so as to apply the signal H to the AND gate 71 and the signal $\overline{H}$ to the AND gate 69.

Further, in describing the system it has also been assumed that the phase of the reference wave B is such that its positive half cycle occurs during the first half of the cycle of the cycling counter 23 and that its negative half cycle occurs during the second half cycle of the counter. However, this could be reversed, and the phase of the feedback signal C could be shifted 180° (relative to that reference wave) from that shown in FIGS. 2a–2c by reversing the connection of the sine wave shaper 25 to the resolver rotor winding 33. The system would then function in the same manner described.

Further, if only the feedback wave C were reversed in phase by 180° relative to that shown in FIGS. 2a–c (for example, by reversing the input connections to the resolver winding 33), the zero phase error condition would obtain when the command phase pulses F coincide with the positive-going zero crossings (rather than negative-going crossings) of the feedback wave C. Such reversal could be compensated for by merely reversing the connections from the G and $\overline{G}$ outputs of the square wave shaper. This illustrates the fact that negative or positive-going zero crossings may be used as reference instants, this being a matter of choice.

As a final example, if the counter 23 is arranged to repeatedly count down (instead of up as previously described) the command phase angle $\phi 1$ of the compare pulses F will lag or lead the mid-point $B_0$ of the reference wave when the command number is respectively less than or greater than the mid-point value (e.g., 500) of the reference number. This reversal may be compensated for by reversing the input connections to the resolver winding 33, and the performance of the system would be the same.

While in certain ones of the claims appended hereto, reference has been made to specific polarities, positive or negative zero crossings, and setting or resetting of a bistate device in the interest of clarity and understandability, it is intended that the claims be construed to embrace the obviously equivalent reversals of the nature described above.

MODIFICATION ILLUSTRATED BY FIG. 3

In the preferred embodiment described with reference to FIG. 1, the single cycling counter 23 serves the dual function of producing (a) the recurring reference square wave A (from which the sinusoidal reference wave B is derived in order to excite the feedback resolver 27) and (b) the signals which digitally represent in 5421 binary code the reference number cyclically changing in synchronism with the reference wave. The use of the particular 5421 code is preferred because the square wave A from the last stage of the hundreds decade 23–3 changes in level after each 500 pulses are received from the source 21 and the successive half cycles of that square wave are symmetrical.

Figure 3:
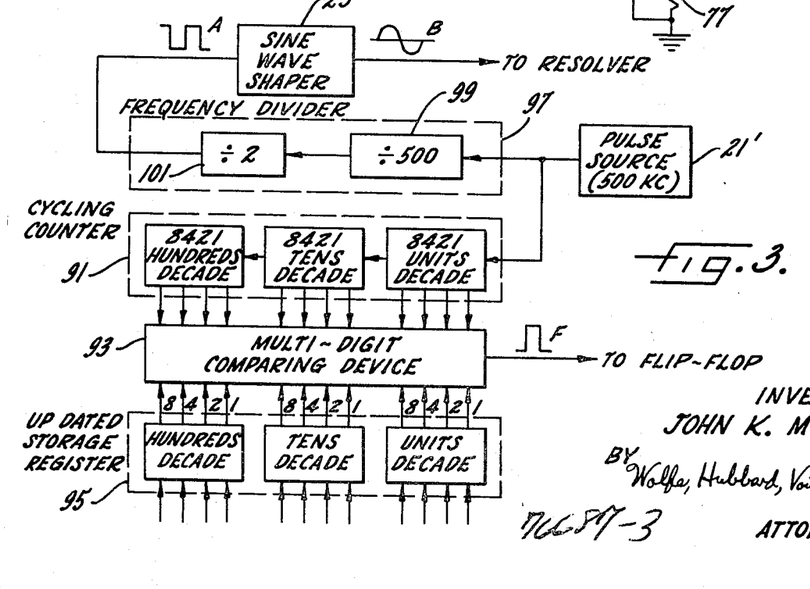
FIG. 3 is a block diagram illustrating a modification of the system shown in FIG. 1.

However, the invention may be practiced by employing separate components to respectively (a) produce the recurring reference wave and (b) digitally signal a cyclically changing reference number. Moreover, digital signaling of the reference and command numbers may be provided in either straight binary notation or in binary decimal codes other than 5421. FIG. 3 diagrammatically shows apparatus corresponding to a portion of FIG. 1 and illustrates such modifications.

As shown in FIG. 3, a pulse source 21' supplies pulses at a constant frequency of 500 kilohertz to both a frequency dividing counter 97 and a cycling counter 91. Both such counters have a count capacity of 1000 (i.e., 000 to 999) and they will thus both execute a complete counting cycle in response to 1000 pulses from the source 21' and in the same time interval. In this arrangement, however, the dividing counter 97 contains two tandem sections 99 and 101 of any suitable organization which respectively divide by 500 and 2, so that the total frequency division factor is 1000. Thus, the recurring output from the last section of the counter 97 is a square wave A at a frequency of 500 c.p.s. This square wave is converted to sinusoidal form B by the wave shaper 25' and the reference wave B is utilized as described above in connection with FIG. 1.

The cycling counter 91 may be a three decade counter which on its several output lines digitally represents a reference number which cyclically increases from 000 to 999 in response to pulses from the source 21'. In this instance, however, each decade is of the type comprising four flip-flops interconnected so as to signal decimal digit values 0 to 9 in 8421 binary code in response to each ten input pulses which it receives. Such multi-decade counters operating with the 8421 binary code are per se well known in the art.

Preferably both counters 97 and 91 count in unison, i.e., pass through 000 on the same pulse from the source 21'. In that case, the reference mid-point value for the reference number signaled by the counter 91 will be 500, as described above. However, the counters 91 and 97 may cycle with a fixed differential, e.g., the counter 91 may hold a count of 100 at the instant the counter 97 holds a count of 000. In such latter case, the mid-point value for the signaled reference number would be 600, assuming the waves A and B to be in phase with one another. In either case, the cyclically changing reference number signaled by the counter 91 will be synchronized with a predetermined time relationship to the reference wave B derived from the counter 97.

Because the cycling counter 91 represents the changing reference number in 8421 code, the updated storage register 95 may store and digitally signal the changing command number in 8421 code. The updated command information may be periodically dumped into this register from any suitable source, as explained above with reference to FIG. 1. The reference number and command number signaled by the counter 91 and register 95 are supplied as inputs to a multi-digit compare device 93, and the latter produces a phase variable compare pulse F each time the reference number passes through a value equal to the then-stored command number. The remainder of the modified system may be like that illustrated in FIG. 1, and thus is not shown in FIG. 3.

It will be apparent from comparison of FIGS. 1 and 3 that the invention here described may be embodied equally well in apparatus where separate means are provided to produce a reference wave and to signal a cyclically changing reference number, or where a single means serves both functions and, in effect, constitutes two separate means.

By the foregoing description, it has been made clear that the present invention brings to the art an advantageous system for controlling the instantaneous position of a movable element according to the instantaneous value of a changing command number which is represented by binary digital signals. More particularly, because the changing command number is updated and used very frequently (e.g., 500 times per second) it is not necessary that each unit of change of the command number be responded to. Rather, a periodically updated and digitally represented command number, which may change by different amounts at each updating, is utilized to produce accurate "tracking" of a movable element, so that the direction and velocity of the element's motion are made to conform to the sense of the change and the average rate of change of the command number.

I claim as my invention:

1. In a servomechanism for a numerical control system wherein a movable element is translated through distances and at velocities corresponding to numerically defined commands, the combination comprising:
   (a) means for producing first signals digitally representing a reference number which during successive time intervals repeatedly and cyclically changes from a first to a second predetermined value by uniform increments at uniformly time-spaced instants.
   (b) means coupled to said movable element and responsive to its movement for producing a recurring feedback signal indicative by the sense and magnitude of its phase angle, relative to the cycling intervals of said reference number, of the sign and extent of the displacement of the movable element from a datum position,
   (c) a source of second signals which digitally represent a command number periodically updated to represent by its extent, sense, and average rate of change the extent, direction, and velocity of movement of the element,
   (d) means responsive to said first and second signals for producing repeating compare signals at the instants said two signaled numbers are equal, said compare signals being phase modulated, relative to the cycling intervals of said reference number, according to changes in the value of the command number represented by said second signals, and
   (e) means connected to receive said compare signal and said feedback signal for producing a servo-actuating error signal proportional in magnitude and corresponding in polarity to the extent and sense of the phase error between the compare and feedback signals.

2. The combination of claim 1 wherein said means for producing the servo-actuating error signal comprises:
   (a) a bistate device having stable "0" and "1" states,
   (b) means for setting said bistate device to its "1" state in response to each of said compare signals,
   (c) means for resetting said bistate device to its "0" state in response to each positive-going zero crossing of said feedback signal,
   (d) means for producing a signal of one polarity having a predetermined magnitude during those periods when said bistate device is in its "1" state and said feedback signal is concurrently in a positive half cycle, and
   (e) means for producing a signal of the opposite polarity having a predetermined magnitude during those periods when said bistate device is in its "0" state and said feedback signal is concurrently in a negative half cycle, and wherein said combination additionally includes means responsive to said signal of one polarity for driving said movable element in one direction and responsive to the signal of the other polarity for driving said element in the opposite direction at a velocity corresponding to the average value of such signal.

3. The combination of claim 1 wherein said means for producing the servo-actuating error signal comprises:
   (a) tri-state means for generating an output signal which is (1) zero, (2) positive with a predetermined magnitude, or (3) negative with the same magnitude when respectively set to its first, second, or third states,
   (b) means for setting said generating means to its third state in response to a compare signal occurring prior to a negative-going zero crossing during each cycle of said feedback signal and resetting said generating means to its first state when such zero crossing occurs,
   (c) means for setting said generating means to its second state in response to a negative-going zero crossing of said feedback signal occurring prior to a compare signal during each cycle of said feedback signal and for resetting said generating means to its first state when such compare signal occurs,
   (d) means for producing a polarized signal which varies as the average value of said output signal, and wherein said combination additionally includes means for driving said movable element in a direction and at a velocity corresponding respectively to the polarity and magnitude of said polarized signal.

4. In a servomechanism for a numerical control system wherein a movable element is translated through distances and at velocities corresponding to numerically defined commands, the combination comprising
   (a) means for generating a cyclically recurring reference signal,
   (b) means excited by said reference signal and coupled to said movable element for generating a feedback signal of the same frequency as said reference signal but shifted in phase therefrom in a sense and by an amount representative of the sign and extent of the displacement of the movable element from a datum position,
   (c) means synchronized with said first means for producing first signals digitally representing a reference number which incrementally changes during each cycle of said reference signal from a predetermined first value by uniform amounts and at uniform intervals to a predetermined second value,
   (d) means for producing second signals digitally representing a command number which is periodically changed no more frequently than once during each cycle of said reference signal, said command number always falling within the range defined by said first and second values, and changing by an amount, in a sense, and at an average rate corresponding respectively to the desired extent, direction and velocity of motion of said element,
   (e) means connected to receive said first and second signals for producing a repeating compare signal at each instant said two signalled number are equal,
   (f) a bistate device having stable "0" and "1" states,
   (g) means for setting said bistate device to its "1" state in response to each of said compare signals,
   (h) means for resetting said bistate device to its "0" state in response to each positive-going zero crossing of said feedback signal,
   (i) means for producing a first error signal having a predetermined magnitude during periods when said bistate device is in its "1" state and said feedback signal is concurrently in a positive half cycle, (j) means for producing a second error signal having a predetermined magnitude during periods when said bistate device is in its "0" state and said feedback signal is concurrently in a negative half cycle, and (k) means controlled by said first error signal for driving said movable element in one direction and controlled by said second error signal for driving said element in the opposite direction at a velocity corresponding to the average value of the prevailing error signal.

5. In a servomechanism for a numerical control system wherein a movable element is translated through distances and at velocities corresponding to numerically defined commands, the combination comprising:

(a) a source of regularly recurring pulses having a substantially constant first frequency, (b) a multistage counter driven by said pulses and in turn generating
  (1) a cyclically recurring reference signal having a substantially constant second frequency which is a predetermined fraction of said first frequency,
  (2) during each cycle of said reference signal, first signals digitally representing a reference number which changes by uniform increments and at uniform intervals from a first value to a second value, (c) means excited by said reference signal and coupled to said movable element for producing a cyclically recurring feedback signal indicative by the sense and magnitude of its phase angle, relative to the reference signal, of the sign and extent of the displacement of the movable element from a datum position, (d) a source of second signals representing a command number which dynamically changes at instants spaced apart in time no less than the period of said reference signal, (e) a comparator connected to receive said first and second signals for producing a compare signal at those instants when said reference number and said command number are equal, (f) tri-state means for generating an output signal which is (1) zero, (2) positive with a predetermined magnitude, or (3) negative with the same magnitude when respectively set to its first, second, or third states, (g) means for setting said generating means to its third state in response to a compare signal occurring prior to a negative-going zero crossing during each cycle of said feedback signal and resetting said generating means to its first state when such zero crossing occurs, (h) means for setting said generating means to its second state in response to a negative-going zero crossing of said feedback signal occurring prior to a compare signal during each cycle of said feedback signal and for resetting said generating means to its first state when such compare signal occurs, (i) means for integrating said output signal to produce a polarized D.C. signal, and (j) means for driving said movable element in a direction and at a velocity corresponding respectively to the polarity and magnitude of said D.C. signal.

6. In a servomechanism for a numerical control system wherein a movable element is translated through distances and at velocities corresponding to numerically defined commands, the combination comprising:

(a) means for generating a recurring reference signal, (b) means excited by said reference signal and coupled to said movable element for producing a cyclically recurring feedback signal indicative by the sense and magnitude of its phase angle, relative to the mid-cycle point of the reference signal, of the sign and extent of the displacement of the movable element from a datum position, (c) means for producing first signals digitally representing a reference number which incrementally changes during each cycle of said reference signal from a predetermined first value by uniform amounts and at uniformly spaced instants to a predetermined second value, (d) means for producing second signals digitally representing a command number which dynamically changes at instants spaced apart in time no less than the period of said reference signal,
  (1) said command number always falling within the range defined by said first and second values, and changing by a total extent, in a sense and at an average rate corresponding respectively to the desired displacement, direction and velocity of motion of the movable element, (e) means responsive to said first and second signals for producing a repeating compare signal at each instant when said two signaled numbers are equal,
  (1) said compare signal thereby being time phase relative to the negative-going zero crossing of the reference signal by an angle which in sign and magnitude substantially corresponds to the sign and the magnitude of the difference between the value of the command value of said reference number signaled at those instants when said reference wave is at the mid-point of each of its cycles, (f) a bistate device having stable "0" and "1" states, (g) means for setting said bistate device to its "1" state in response to each of said compare signals, (h) means for resetting said bistate device to its "0" state in response to each positive-going zero crossing of said feedback signal, (i) positive and negative constant magnitude signal generating means settable to off, positive on, and negative on states, (j) means for causing said generating means to produce a negative output signal during those periods when said bistate device is in its "1" state and said feedback signal is concurrently in a positive half cycle, (k) means for causing said generating means to produce a positive output signal during those periods when said bistate device is in its "0" state and said feedback signal is concurrently in a negative half cycle, (l) means for filtering the output signal of said generating means to produce a smoothed variable control signal, and (m) means for driving said movable element in a direction and at a velocity corresponding respectively to the polarity and magnitude of said control signal.

7. In a servomechanism for a numerical control system wherein a movable element is translated through distances and at velocities corresponding to numerically defined commands, the combination comprising:

(a) means for generating a train of regularly recurring pulses having a substantially constant first frequency, (b) digital counting means, driven by said pulse generating means, for generating in response thereto
  (1) a cyclically recurring reference signal having a substantially constant second frequency which is a predetermined fraction of said first frequency,
  (2) during each cycle of said reference signal, first signals digitally representing a reference number which increases by a unit value in response to each of said pulses from zero to the capacity of the counter, (c) means coupled to said movable element and responsive to said reference signal for producing a recurring feedback signal indicative by the sense and magnitude of its phase angle, relative to the mid-cycle point of said reference signal, of the sign and extent of the displacement of the movable element from a datum position, (d) means for producing second signals digitally representing a command number which periodically changes no oftener than once during each cycle of said reference signal, said command number always falling between zero and the capacity of said counter, and changing at an average rate which represents the commanded velocity of said element, (e) means responsive to said first and second signals for producing a repeating compare signal at each instant said two signaled numbers are equal,
  (1) said compare signal thereby being time phased relative to the reference signal by an angle which in sign and magnitude corresponds to the sign and the magnitude of difference between one-half of the capacity of said counter and the command number, (f) means connected to receive said compared signal and said feedback signal for producing a polarized control signal representative of the sense and magnitude of the time phase angle between said compare signal and the negative-going zero crossing of said feedback signal, and (g) means responsive to said control signal for driving said movable element in a direction and at a velocity corresponding to the polarity and magnitude of said control signal.

References Cited

UNITED STATES PATENTS

| | | | |
|---|---|---|---|
| 3,165,680 | 1/1965 | Morrison | 318—28 |
| 3,175,138 | 3/1965 | Kilroy et al. | 318—28 |
| 3,258,667 | 6/1966 | McDonough et al. | 318—18 |
| 3,340,451 | 9/1967 | Farrand | 318—30 XR |

BENJAMIN DOBECK, Primary Examiner

U.S. Cl. X.R.

318—601, 603